US011341925B2

(12) United States Patent
Files et al.

(10) Patent No.: US 11,341,925 B2
(45) Date of Patent: May 24, 2022

(54) INFORMATION HANDLING SYSTEM ADAPTING MULTIPLE DISPLAY VISUAL IMAGE PRESENTATIONS

(71) Applicant: Dell Products L.P., Round Rock, TX (US)

(72) Inventors: Jace W. Files, Round Rock, TX (US); John T. Morrison, Round Rock, TX (US); Gerald R. Pelissier, Mendham, NJ (US); Preeth K. Srinivasan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/401,718

(22) Filed: May 2, 2019

(65) Prior Publication Data
US 2020/0349895 A1 Nov. 5, 2020

(51) Int. Cl.
*G09G 3/34* (2006.01)
*G06F 3/14* (2006.01)
*G06F 3/02* (2006.01)
*G09G 3/36* (2006.01)
(Continued)

(52) U.S. Cl.
CPC .......... *G09G 3/342* (2013.01); *G06F 3/0227* (2013.01); *G06F 3/03547* (2013.01); *G06F 3/0416* (2013.01); *G06F 3/1423* (2013.01); *G09G 3/36* (2013.01); *G09G 2300/0478* (2013.01); *G09G 2310/08* (2013.01); *G09G 2320/0686* (2013.01); *G09G 2354/00* (2013.01)

(58) Field of Classification Search
CPC .......... G09G 5/10; G09G 3/20; G09G 3/342; G09G 3/36; G09G 2310/08; G09G 2354/00; G09G 2310/062; G09G 2360/04; G09G 2320/0686; G09G 2300/0478; G06F 1/1673; G06F 1/1616; G06F 1/3262; G06F 3/1423; G06F 3/0416; G06F 1/1669; G06F 1/1643; G06F 3/0227; G06F 3/03547; G06F 1/1641; G06F 3/0231
See application file for complete search history.

(56) References Cited

U.S. PATENT DOCUMENTS 5,396,351 A 3/1995 Gessel
5,553,296 A 9/1996 Forrest et al.
5,699,444 A 12/1997 Palm
(Continued)

OTHER PUBLICATIONS

U.S. Appl. No. 16/107,748, entitled "Context Aware Secondary Screen UI on Dual Screen Productivity 2-in-1 Devices", filed Aug. 21, 2018, by Viswanathan et al.

*Primary Examiner* — Kwang-Su Yang
(74) *Attorney, Agent, or Firm* — Zagorin Cave LLP; Robert W. Holland

(57) ABSTRACT

A portable information handling system presents visual images at first and second displays integrated in first and second rotationally-coupled housing portions. When the housing portions rotate to a clamshell configuration, a keyboard disposed on one of the displays accepts keyed inputs and, to save power, backlight segments below the keyboard are powered down. The display can present information as visual images proximate the keyboard with illumination provided by other backlight segments or by a secondary light source that is presented in coordination with liquid crystal panel pixels transitioning to transparent and opaque states.

13 Claims, 15 Drawing Sheets

(51) Int. Cl.
   *G06F 3/0354*   (2013.01)
   *G06F 3/041*   (2006.01)

(56) References Cited

U.S. PATENT DOCUMENTS

| | | |
|---|---|---|
| 5,825,436 A | 10/1998 | Knight |
| 5,894,298 A | 4/1999 | Hoeksma |
| 6,252,602 B1 * | 6/2001 | Matsuda ............ G06F 3/04815 345/473 |
| 6,322,229 B1 | 11/2001 | Chan et al. |
| 6,646,626 B1 | 11/2003 | Uskali et al. |
| 7,301,532 B1 | 11/2007 | Dobry |
| 7,430,003 B2 | 9/2008 | Nichols et al. |
| 7,502,010 B2 | 3/2009 | Kirk |
| 7,843,429 B2 | 11/2010 | Pryor |
| 8,707,174 B2 | 4/2014 | Hinckley et al. |
| 9,395,762 B2 | 7/2016 | Sharma et al. |
| 9,524,139 B2 | 12/2016 | Aurongzeb et al. |
| 9,946,373 B2 | 4/2018 | Graf et al. |
| 10,204,592 B1 | 2/2019 | Trim et al. |
| 2006/0132447 A1 | 6/2006 | Conrad |
| 2007/0239921 A1 * | 10/2007 | Toorians ............ G06F 1/3203 710/306 |
| 2009/0115937 A1 | 5/2009 | Guo et al. |
| 2011/0209039 A1 | 8/2011 | Hinckley et al. |
| 2012/0066591 A1 | 3/2012 | Hackwell |
| 2012/0162238 A1 | 6/2012 | Fleck et al. |
| 2013/0258218 A1 | 10/2013 | Takagi et al. |
| 2014/0029183 A1 | 1/2014 | Ashcraft et al. |
| 2014/0078116 A1 | 3/2014 | Mercea et al. |
| 2014/0101578 A1 * | 4/2014 | Kwak ............ G06F 1/1647 715/761 |
| 2014/0146085 A1 * | 5/2014 | Takeda ............ G06F 1/1632 345/648 |
| 2014/0198287 A1 | 7/2014 | Tamaki |
| 2015/0160800 A1 * | 6/2015 | Kuwahara ............ G09G 3/36 715/760 |
| 2015/0219902 A1 | 8/2015 | Kim |
| 2016/0223817 A1 | 8/2016 | Kizu et al. |
| 2017/0048515 A1 | 2/2017 | Imai |
| 2018/0068609 A1 * | 3/2018 | Yamazaki ............ G06F 1/1626 |
| 2019/0019993 A1 | 1/2019 | Narutaki et al. |
| 2019/0163432 A1 | 5/2019 | Files et al. |
| 2019/0258101 A1 * | 8/2019 | Yasui ............ G02F 1/1347 |
| 2019/0278323 A1 | 9/2019 | Aurongzeb et al. |

* cited by examiner

INFORMATION HANDLING SYSTEM ADAPTING MULTIPLE DISPLAY VISUAL IMAGE PRESENTATIONS

CROSS REFERENCE TO RELATED APPLICATION

U.S. patent application Ser. No. 16/401,756, filed May 2, 2019, entitled "Information Handling System Multiple Display Viewing Angle Brightness Adjustment" by inventors Gerald R. Pelissier, Jace W. Files, Chiu-Jung Tsen, Yung-Chun Liu, and John T. Morrison, describes exemplary methods and systems and is incorporated by reference in its entirety.

BACKGROUND OF THE INVENTION

Field of the Invention

The present invention relates in general to the field of portable information handling systems, and more particularly to an information handling system adapting multiple display visual image presentations.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Recently, convertible information handling systems have been introduced that integrate a touchscreen display across both housing portions. Dual display systems rotate 180 degrees from a closed configuration to a flat configuration that offers a large tablet surface area. Alternatively, rotation of approximately 90 degrees from a closed configuration to a clamshell configuration aligns one display in a horizontal typing orientation with the other display held in a vertical viewing orientation. In the clamshell mode, presentation of a keyboard on the horizontal display allows an end user to type inputs without a physical keyboard. If a physical keyboard is available, the end user may place the keyboard over top of the horizontal display or use the keyboard separately so that the horizontal display is available to present information as visual images.

One difficulty that arises with such dual display portable information handling systems is that flat panel displays tend to present visual images most clearly at orthogonal viewing angles. As an end user's viewing angle becomes less orthogonal relative to the display, images presented at the display tend to appear less bright and of a generally lower quality. When a dual screen portable information handling system is in a clamshell configuration, the vertical display is typically orthogonal but the horizontal display is typically at 30 to 45 degrees relative to the viewer depending on the viewing position. This non-orthogonal angle results in less brightness at the display. One solution to this reduced brightness is to increase brightness output by the display, however, this increases power consumption and has a considerable impact on battery life.

Another difficulty that arises with dual display portable information handling systems is that power consumed by the displays can represent 50% of total system power draw. In a clamshell configuration, presentation of visual images at a vertically-aligned surface tends to have a greater significance than presentation of visual images at the horizontally-aligned surface. The vertically-aligned display provides "SEE" functions that generally relate to visual image presentation as outputs for end user consumption. In contrast, the horizontally-aligned display provides "DO" functions that generally relate to visual image presentation meant to guide end user inputs to the information handling system. Generally, input user interfaces have less detailed visual images for presentation, although in some cases, such as a writing pad that accepts stylus inputs, a "DO" surface may also have detailed visual images. In some instances, a large portion of the "DO" surface may have no visual images at all, such as when a keyboard rests on the display. Generally, to support presentation of detailed visual images, a horizontal display surface consumes power at a rate like the vertical display surface even though a less detailed visual image presentation is made.

SUMMARY OF THE INVENTION

Therefore, a need has arisen for a system and method which increases display brightness at non-orthogonal viewing angles, such as can result when rotationally coupled housing portions transition between different rotational orientations.

A further need exists for a system and method that manages power consumption of multi-display information handling systems based upon each display's rotational orientation and/or function.

In accordance with the present invention, a system and method are provided which substantially reduce the disadvantages and problems associated with previous methods and systems for managing display visual image presentation. Display backlight illumination is segmented into plural individually controlled portions so that illumination from segments located below an object, such as keyboard disposed over the display, can be turned off to reduce power consumption. A refractive layer disposed between an end user and display illumination adapts display illumination to selectively proceed along an orthogonal or non-orthogonal axis based on the end user relative viewing angle.

More specifically, a portable information handling system disposes first and second displays in first and second rotationally coupled housing portions. The housing portions rotate between a closed position having the displays closed over top of each other to a clamshell position having the displays opened to substantially perpendicular orientations. In the clamshell orientation, one housing portion rests on a support surface to deploy its display in a horizontal orientation and supporting the other housing portion and its display in a vertical orientation. The horizontally oriented display provides a "DO" surface, such as by accepting touches at a keyboard presented by the display. In the "DO" position, a refractive layer integrated in the display is activated to change the orthogonal angle at which light proceeds from the display to a non-orthogonal angle directed towards the end user position. An end user may instead choose to place a physical keyboard over the display to type inputs. A segmented backlight in the "DO" display turns off backlight illumination under the keyboard to reduce power consumption. In addition, secondary illumination may be used to create visual images without illumination by the backlight, such as with a light guide or fiber optic cable that creates a touchpad near the keyboard.

The present invention provides a number of important technical advantages. One example of an important technical advantage is that a display that transitions to a non-orthogonal viewing angle automatically adjusts the presentation of visual images to adapt to the non-orthogonal viewing angle so that image brightness is maintained relative to the viewer without additional power consumption. A horizontally-oriented display becomes a "DO" surface that presents visual images with locally controlled brightness that adapts based upon a type of "DO" user interface presented and an end user's viewing angle. For instance, in a clamshell orientation a display integrated in a vertically oriented housing portion performs "SEE" functions that present output as visual images while a display integrated in a horizontally oriented housing portion performs "DO" functions that accept end user inputs, such as through a keyboard or writing pad user interface presentation. These "DO" functions adapt presentation orientation viewing angle and brightness based upon end user actions to enhance the end user experience while reducing power consumption.

Another example of a technical advantage is that a display in a "DO" configuration that has a keyboard placed over it to accept keyed inputs reduces power consumption by powering down backlight segments disposed below the keyboard. Portions of the display located near the keyboard may continue to present visual images that enhance keyboard interactions, such as a function key row or a touchpad area. In one alternative embodiment, power consumption is further reduced by using a secondary light source to provide image presentation at the display. For example, a fiber optic cable traces a device, such as a touchpad, underneath the display backlight so that the device is presented with less power consumption than would be used by the backlight. In one embodiment, pixels of the display are driven to a transparent state at locations where the secondary backlight is visible and an opaque state that highlights a border around the transparent state.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A multi-display portable information handling system adapts display illumination based upon housing rotational configuration. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
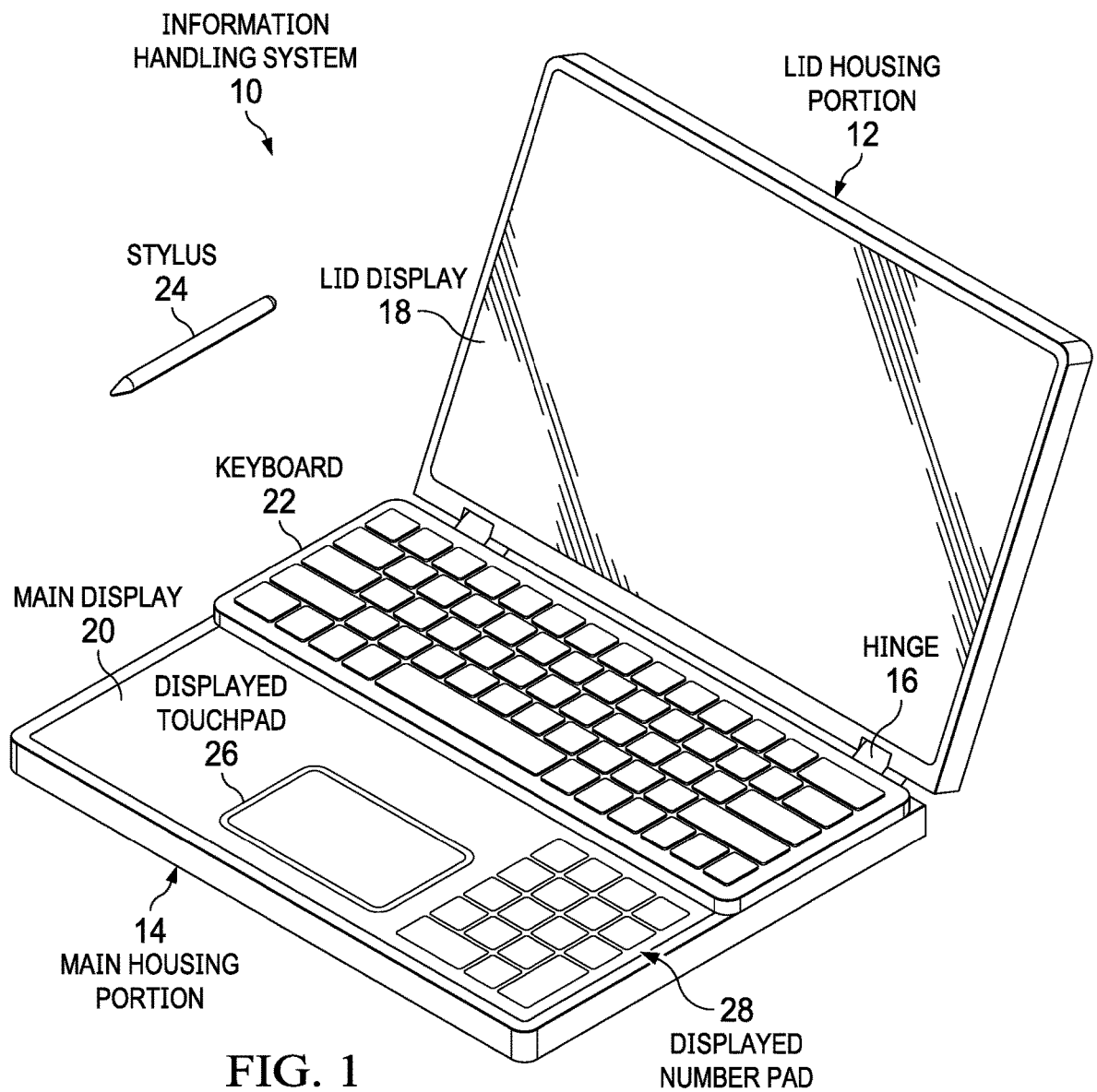
FIG. 1 depicts a front perspective view of a portable information handling system in a clamshell configuration and adapting display presentation of visual information.

Referring now to FIG. 1, a front perspective view depicts a portable information handling system 10 in a clamshell configuration and adapting display presentation of visual information. In the example embodiment, portable information handling system 10 includes processing components in a lid housing portion 12 and main housing portion 14 that are rotationally coupled by hinges 16. The processing components process information that is output as visual images at a lid display 18 and a main display 20. Inputs to processing components of information handling system 10 are made through a touchscreen integrated in displays 18 and 20 and through a keyboard 22 that rests on top of main display 20. In addition, inputs may be made by touches of a stylus 24 at either touchscreen. In the example embodiment, information handling system 10 main housing 14 and lid housing 12 are reversible in the clamshell configuration, such as by resting lid housing portion 12 on a horizontal support surface so that it holds main housing portion 14 in a vertical viewing orientation. In some example embodiments, all of the adaptable display presentation techniques described herein may be mirrored by both housing portions; in other example embodiments, main housing portion 14 adapts as a base in a manner that is not available in lid housing portion 12. Where display presentation adaption is not mirrored, end users may be provided with an indication of the housing portion that provides the best adaption as the main versus the lid portion in the clamshell configuration.

The example embodiment of FIG. 1 depicts several adaptations to visual information presentation performed by a dual display information handling system 10 that moves separate housing portions between different configurations, such as by rotating about hinges 16 from a closed to a clamshell configuration. One example adaptation is that main display 20 detects placement of keyboard 22 on main display 20, such as by a touch pattern detected at the touchscreen, and in response adapts presentation of visual images at main display 20 to enhance end user interactions and reduce power consumption. For example, one keyboard 22 blocks presentation of visual images at main display 20, visual information presented at main display 20 is shifted upward to lid display 18 and segmented backlights located under keyboard 22 are shut off to reduce power consumption. In addition, pixels of a liquid crystal panel under keyboard 22 have an opaque setting applied to reduce transparency and offer a dark appearance to the end user. At the portions of main display 20 that remain visible to the end user, a variety of lower power utility user interfaces are presented, such as touchpad 26 shown as a rectangle and a number pad 28 that shows number keys. In one example embodiment, touch inputs at main display 20 are disabled except within the utility user interfaces. In another example embodiment, utility user interfaces are presented if lid housing portion 12 and main housing portion 14 have rotated to a clamshell configuration. For instance, if information handling system 10 remains in a tablet configuration, then placement of keyboard 22 on a portion of main display 20 may maintain existing content on the portion of main display 20 that is not covered.

In the example embodiment, utility user interfaces touchpad 26 and number pad 28 may be presented as visual images at main display 20 generated through normal graphics or may be presented with lower power consumption secondary light sources. For example, a fiber optic cable or lightguide disposed under main display 20 may illuminate the presented visual images through main display 20 while the backlight of main display 20 powers down. To enhance the appearance of the secondary light source, pixels in the liquid crystal panel of main display 20 may have a transparent setting at the secondary light source and an opaque setting proximate to the secondary light source. The transparent and opaque pixels settings contrast illumination that proceeds through main display 20 to highlight the desired utility user interfaces. In another alternative embodiment, backlight segments that illuminate pixels of main display 20 may match desired utility user interfaces so that backlight illumination is limited to the portion of main display 20 that has a utility user interface, thus reducing power consumption. In another example embodiment, an adjustment applied by a refractive layer within main display 20 re-directs the illumination viewing angle of main display 20 off an orthogonal angle and towards an end user position to further reduce the amount of illumination that achieves a desired presentation to the end user.

Figure 2:
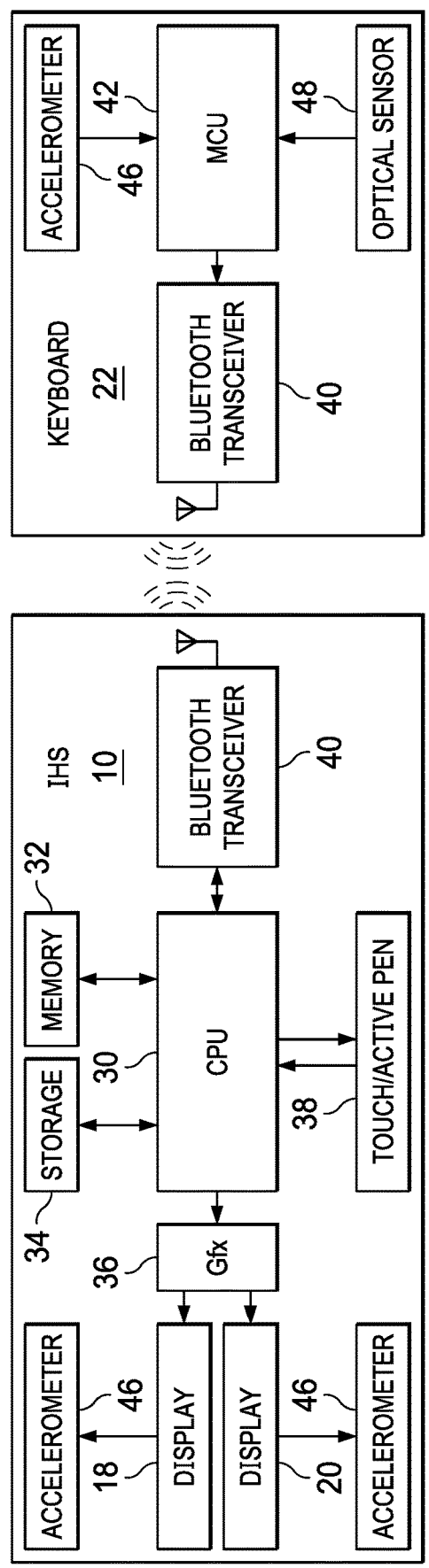
FIG. 2 depicts a block diagram of an information handling system configured to adapt display presentation of visual information based upon a detected housing configuration.

Referring now to FIG. 2, a block diagram depicts an information handling system 10 configured to adapt display presentation of visual information based upon a detected housing configuration. In the example embodiment, a central processing unit (CPU) 30 executes instructions to process information stored in random access memory (RAM) 32, such as an operating system and applications retrieved from a persistent storage device 34 like a solid state drive or hard disc drive. CPU 30 provides visual information to a graphics processor (Gfx) 36 that generates pixel values for presentation of the visual information at displays 18 and 20. End user touch inputs to displays 18 and 20 are reported to CPU 30 from a touch controller 38, which senses touches by the end user finger and/or stylus. A wireless transceiver 40, such as a Bluetooth transceiver, establishes communication with keyboard 22 to accept keyed inputs by wireless communication. Keyboard 22 includes a microcontroller unit (MCU) 42 that interprets keyed inputs, such as detected by an optical sensor 48, and reports the keyed inputs through a transceiver 40 to information handling system 10.

Information handling system 10 determines an operating mode for presentation of visual information at displays 18 and 20 based upon a variety of conditions. In the example embodiment, accelerometers 46 associated with displays 18 and 20 and with keyboard 22 detect a relative orientation to gravity and motion that indicate a system configuration. For example, if accelerometers 46 indicate a vertical orientation of display 18 and a horizontal orientation of display 20, then display 20 has its visual information presentation adapted to assume an input device. Alternatively, if accelerometers 46 indicate a vertical orientation of display 20 and a horizontal orientation of display 18, then display 18 has its visual information presentation adapted to assume an input device. An accelerometer in keyboard 22 aids in detection of the configuration of information handling system 10 by detecting orientation for comparison against the orientations of displays 18 and 20. For instance, the display 18 or 20 that most closely matches the orientation relative to gravity of keyboard 22 may be selected to assume an input device. In the event that keyboard 22 does not rest on a display 18 and 20, keyboard 22 orientation provides a contextual input that aids selection of a visual image orientation through a refractive layer so that a non-orthogonal illumination may be selected for the display 18 or 20 that most closely matches keyboard orientation. In one embodiment, keyboard orientation is only applied as a tool to determine user interface presentation when the keyboard is in use, such as within a predetermined time of keyboard movement or key activation. As another factor, placement of keyboard 22 on one of display 18 or 20 generates a unique touch pattern detected by touch controller 38 and applied to select user interface presentation selection. In addition, stylus inputs may provide an indication of an intended use of each display 18 and 20 that adds context for selection of a user interface presentation.

Figure 3A:
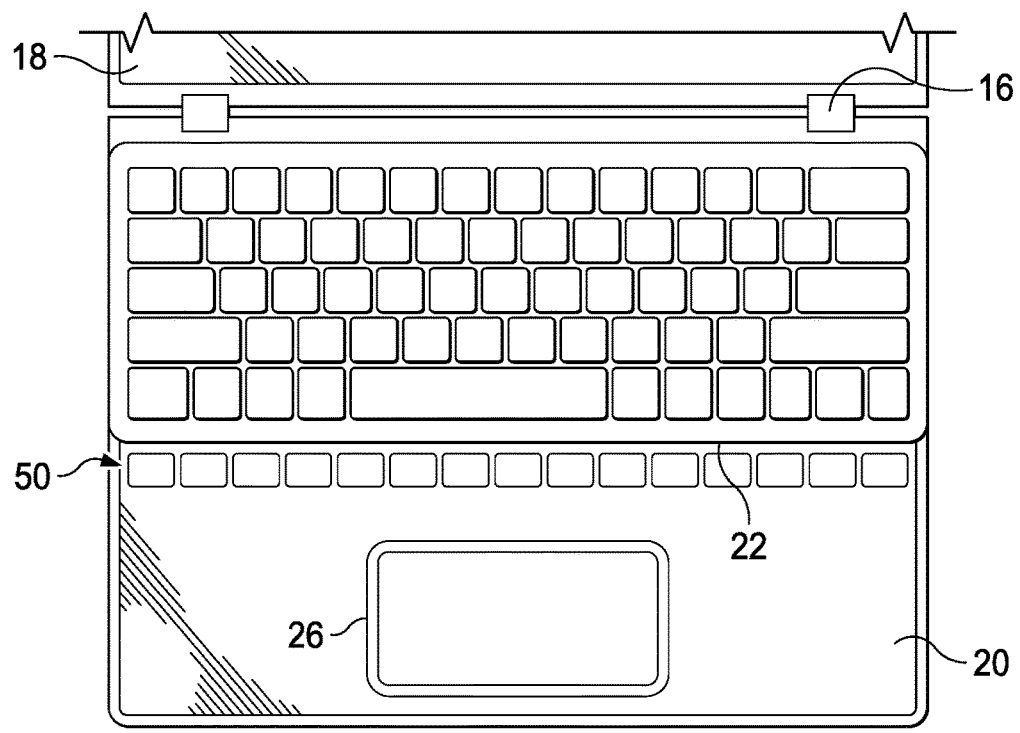
FIGS. 3A and 3B depict an upper view of an example of a function user interface selectively presented along a perimeter of a keyboard.
Figure 3B:
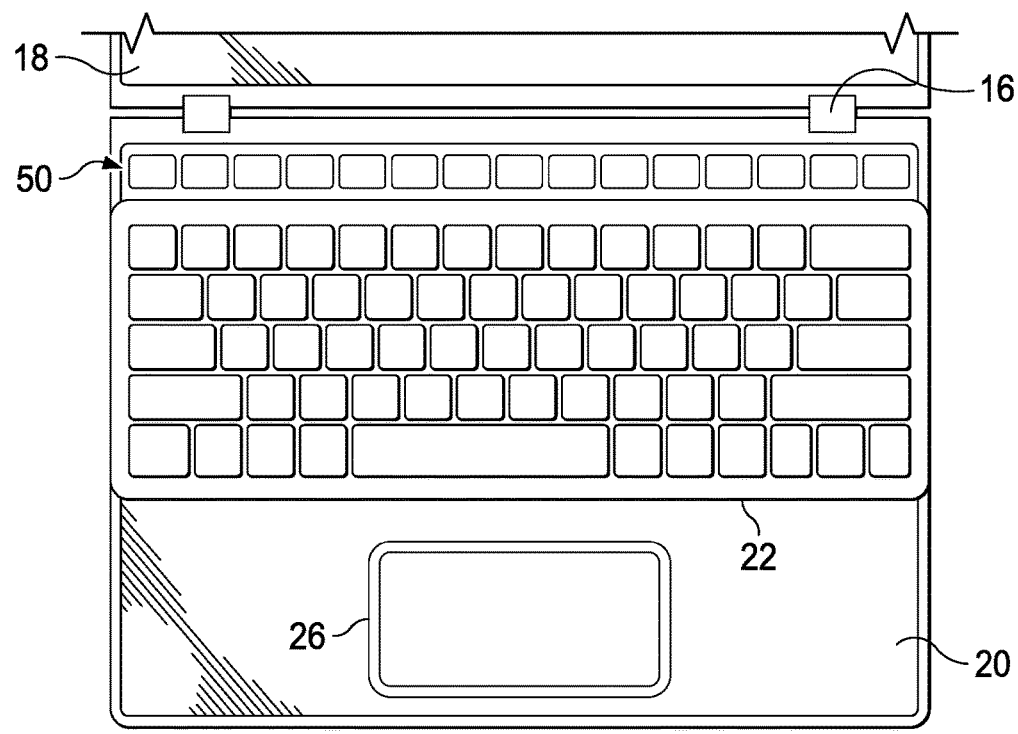

Referring now to FIGS. 3A and 3B, an upper view depicts an example of a function user interface 50 selectively presented along a perimeter of keyboard 22. In the example embodiment, information handling system 10 has rotated displays 18 and 20 about hinges 16 to a clamshell configuration with displays 18 and 20 aligned substantially perpendicular to each other. Generally, a clamshell configuration has displays 18 and 20 rotated 90 to 120 degrees relative to each other, although the amount of rotation may be somewhat greater or less based on the end user's interactions and arrangement for inputting information at one display while viewing images at the other display. In FIG. 3A, a line of function keys 50 is presented between keyboard 22 and touchpad 26. In FIG. 3B, the line of function keys 50 is presented at the top of keyboard 22 proximate hinges 16. In one example embodiment, function keys 50 default to a presentation position above keyboard 22 as depicted by FIG. 3B and present below keyboard 22 as in FIG. 3A if insufficient room exists above keyboard 22. Function keys 50 may be presented by display 20 as a normal user interface or may be generated with a secondary light source as described above.

Figure 4:
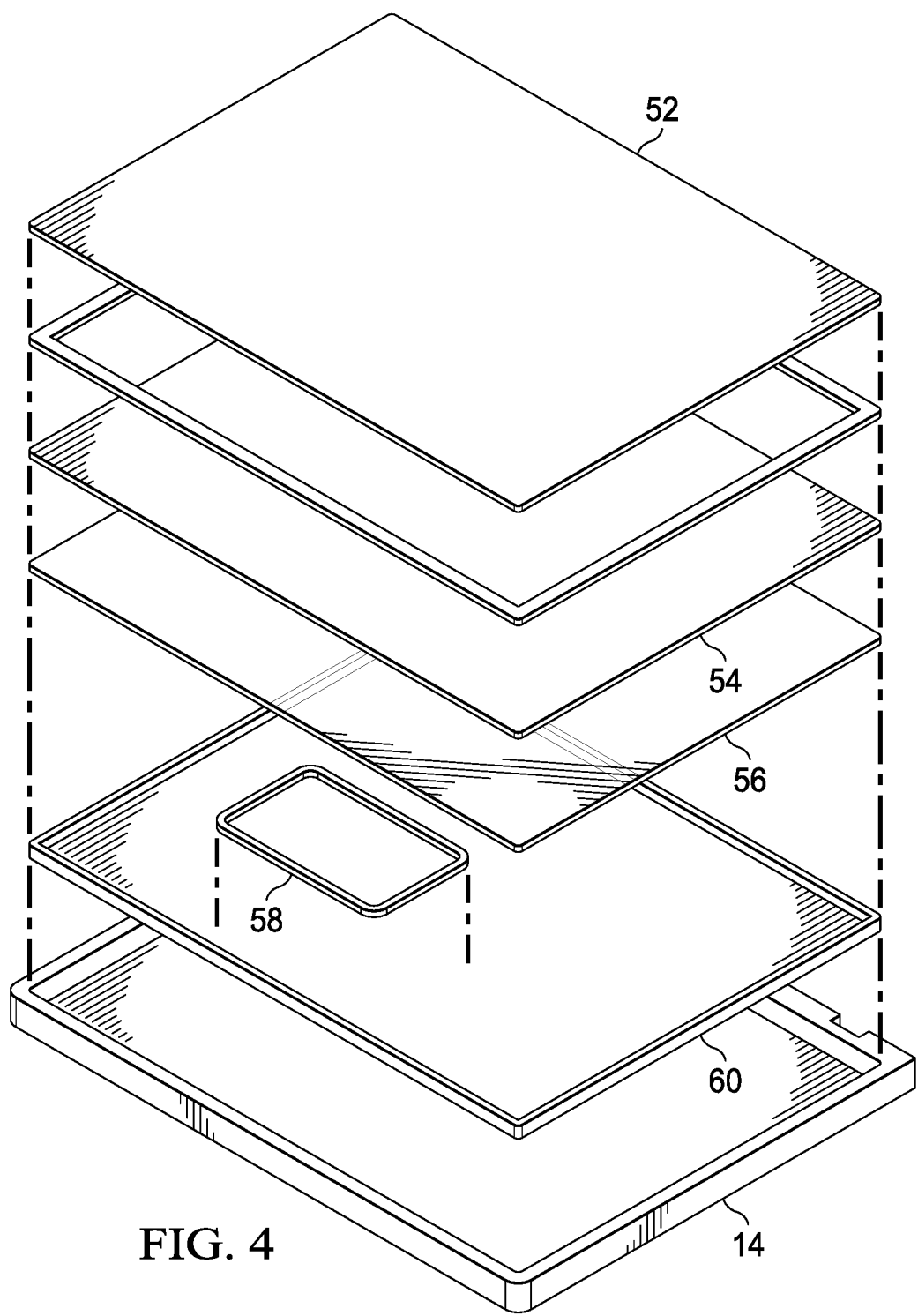
FIG. 4 depicts an exploded side view of a display configured to present visual images with a secondary light source.

Referring now to FIG. 4, an exploded side view depicts a display configured to present visual images with a secondary light source. In the example embodiment, a touch cover 52 protects the display and detects touch inputs, such as with capacitive touch detection sensors. A liquid crystal panel 54 is disposed under touch cover 52 and includes an array of pixels that include liquid crystal material for filtering backlight that escapes through touch cover 52. For instance, each pixel includes red, green and blue liquid crystal elements that mix illumination to generate colors as defined by pixel values provided from a graphics processor. A backlight assembly 56 disposed below liquid crystal panel 54 provides illumination that proceeds through liquid crystal panel 54 to generate the visual images at the display.

A secondary light source 58 is disposed below backlight assembly 56 to provide secondary illumination when backlight assembly 56 is powered off. In the example embodiment, a light pipe or a fiber optic cable is used to from a shape of a touchpad, such as the touchpad 26 depicted by FIG. 1. Illumination from secondary light source 58 proceeds through backlight assembly 56 and liquid crystal panel 54 to present as a visual image seen through cover 52. In one embodiment, liquid crystal panel 54 assigns pixels values that align transparent pixels with secondary light source 58 and opaque pixels elsewhere. The transparent pixel values allow secondary light source 58 illumination to proceed through while opaque pixels highlight the illumination with a sharp contrast. In one embodiment, liquid crystal panel 56 may alter pixel values to present secondary illumination as a desired color. Alternatively, secondary light source 58 may provide a desired color directly. A rear cover 60 assembles the layers 52-58 into an integrated part that couples to housing 14 for manufacture into information handling system 10.

Figure 5:
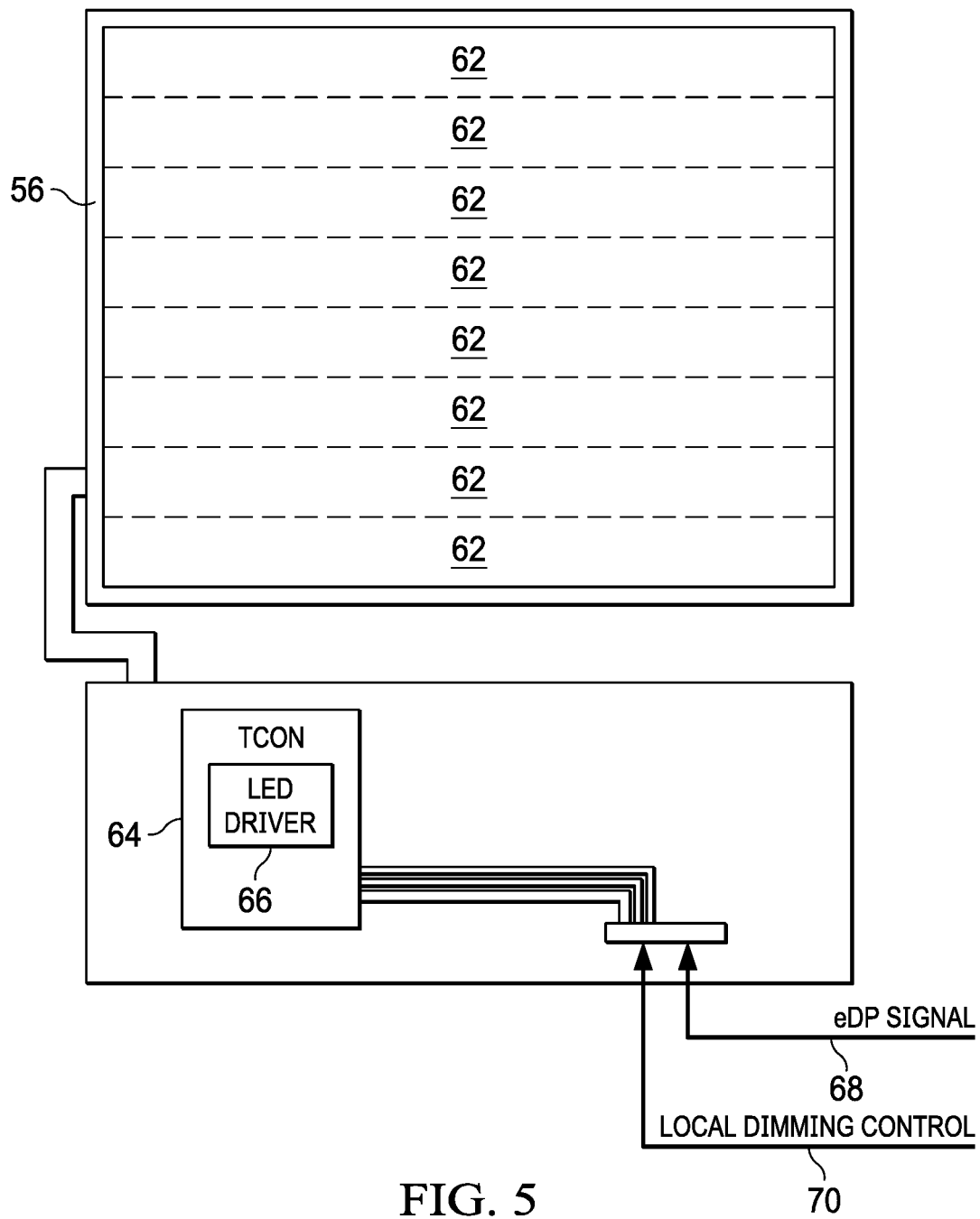
FIG. 5 depicts a block diagram of one example of backlight segmentation to adapt display visual information presentation.

Referring now to FIG. 5, a block diagram depicts one example of backlight segmentation to adapt display visual information presentation. In the example embodiment, backlight 56 includes eight backlight segments 62 disposed across the width of backlight 56 in a parallel symmetric pattern. A timing controller (TCON) 64 of the display includes an LED driver 66 that defines a brightness output at each backlight segment 62, such as based upon commands communicated through an eDP link 68 or through a local dimming control 70. In the example embodiment, keyboard height equates to approximately four backlight segments 62 so that, upon detection of a keyboard at the display, backlight segments 62 may be driven to power off in groups of four, such as a serial command provided through eDP interface 68. In one embodiment, TCON 64 automatically turns off backlight segments 62 at locations indicated by touches as the position of the keyboard and then reports the backlight segment illumination to the operating system of the information handling system. In another example embodiment, upon detection of a keyboard, TCON 64 automatically enables secondary light sources with primary image presentation assumed to transition to a different display. In the event the operating system maintains presentation of visual information over top of the secondary light source, the illumination mixes with the backlight segments 62 that remain illuminated so that the secondary light source is not discernable by an end user.

Figure 6A:
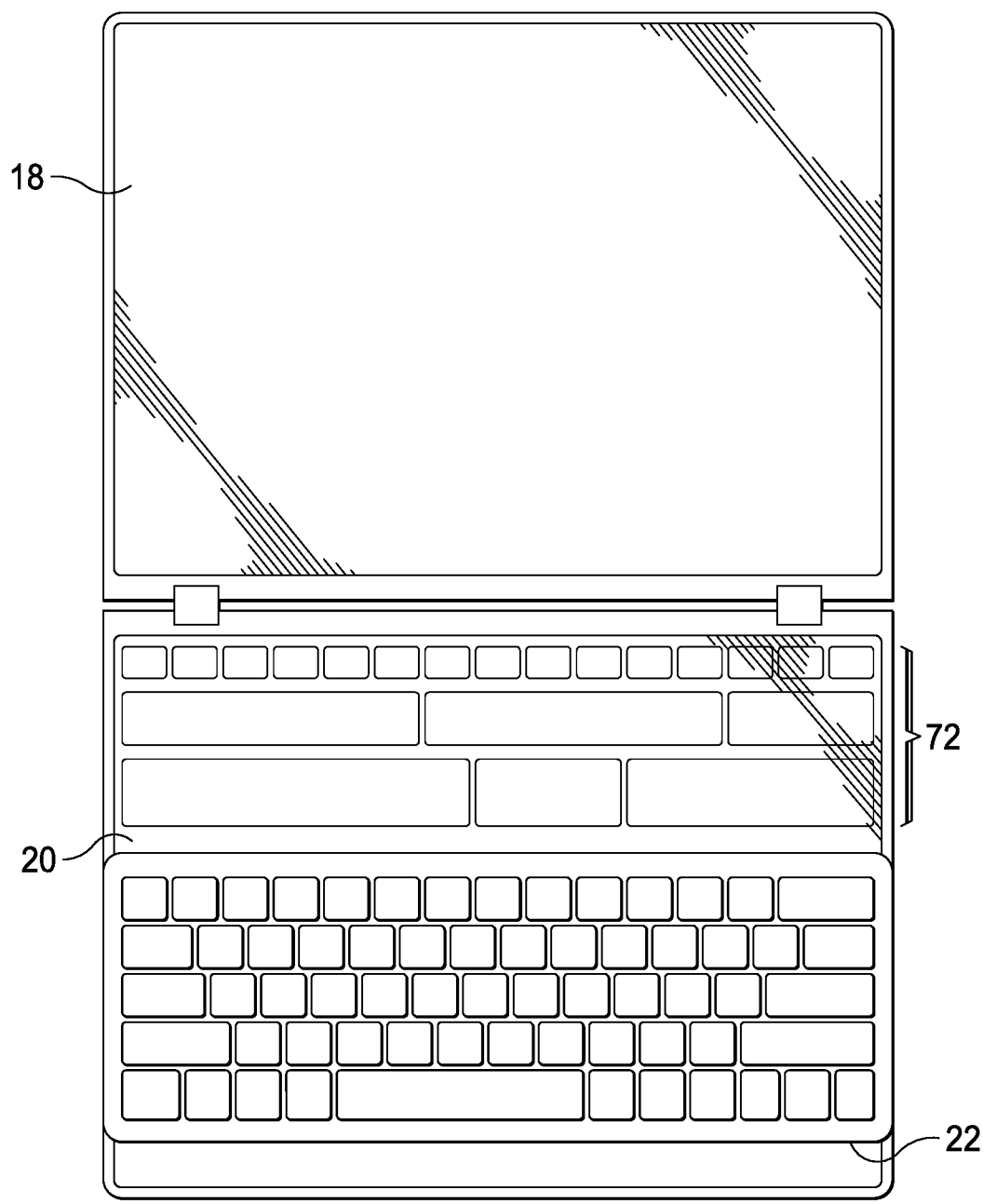
FIGS. 6A-6C depict a top view of example embodiments for selective activation of backlight segments based upon keyboard location.
Figure 6B:
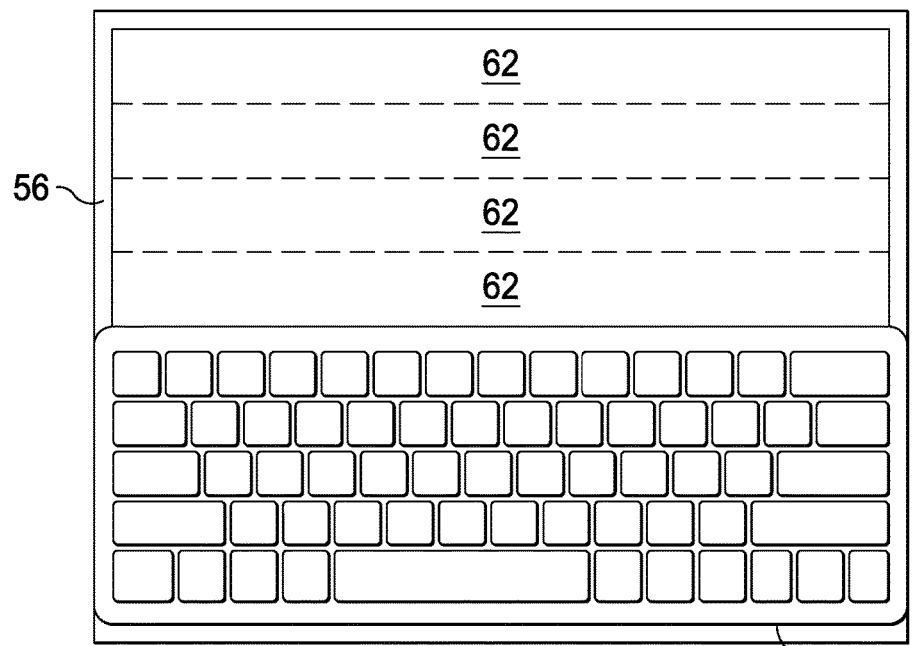
Figure 6C:
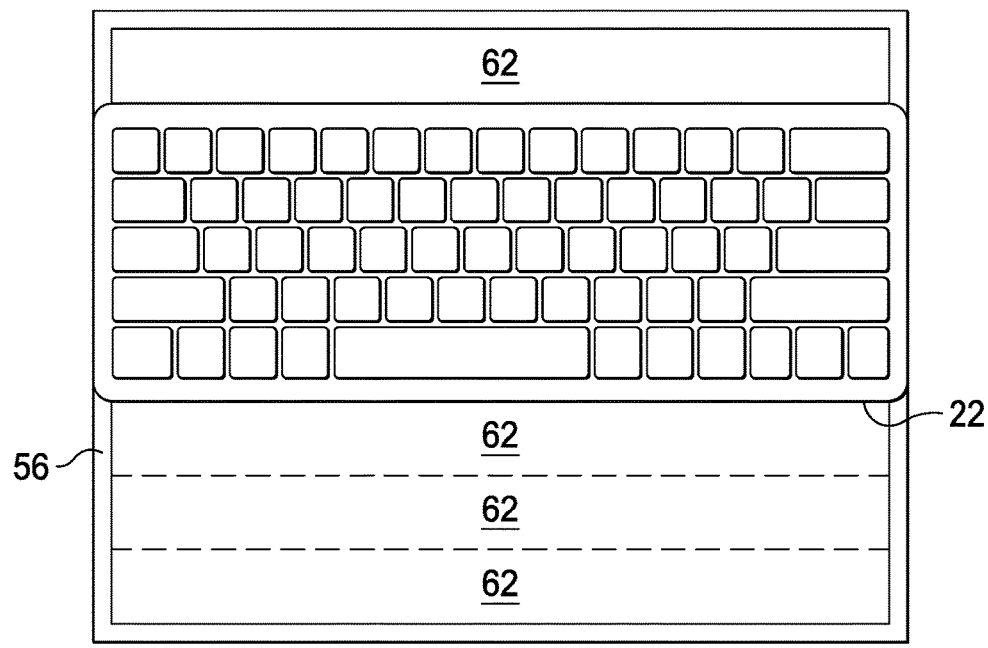

Referring now to FIGS. 6A-6C, a top view depicts example embodiments for selective activation of backlight segments based upon keyboard location. In the example embodiment, information handling system 10 has detected a keyboard 22 placed upon main display 20, resulting in transition of main display 20 content to lid display 18 and presentation of a user interface 72 at main display 20 above keyboard 22 that accepts end user touch inputs to supplement use of keyboard 22. Two different configurations of backlight 56 are depicted that illustrate alignment of backlight segments 62 with keyboard 22 position to determine which backlight segments 62 illuminate. Turning off illumination from backlight segments 62 under keyboard 22 reduces power consumption without impacting the end user experience. Having other backlight segments available to power up allows independent presentation of user interface 72, which may have a variable width based upon keyboard 22 position. Although the example embodiment applies to liquid crystal displays that use a backlight 56 for illumination, in alternative embodiments organic light emitting diode displays (OLED) may be used where pixel illumination is turned off under keyboard 22.

Figure 7:
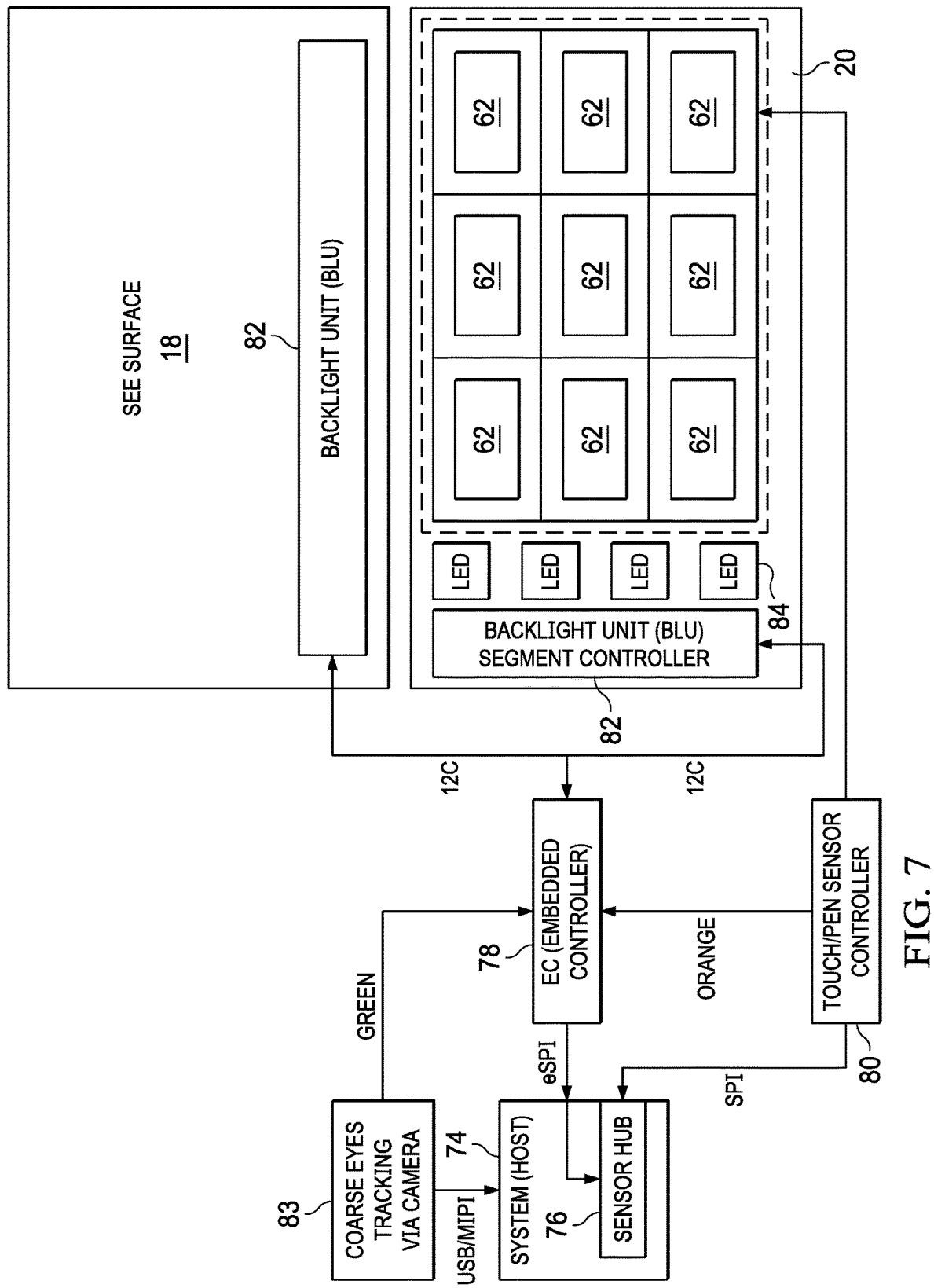
FIG. 7 depicts an alternative embodiment having generation of backlight with rectangular segmentation.

Referring now to FIG. 7, an alternative embodiment depicts generation of backlight with rectangular segmentation. A host system 74, such as CPU and memory executing an operating system, receives sensor inputs from a sensor hub 76, such as accelerometer, touchscreen, ambient light, and other sensors, interacts with a backlight lighting segmentation controller 82 to manage backlight segments 62. In addition to segmentation of backlight illumination, backlight segments 62 may integrate a refractive layer as discussed in greater detail below that adjusts the presentation vector of illumination that passes through a liquid crystal panel disposed over it. In the example embodiment, an embedded controller 78, such as a keyboard controller, executes embedded code stored in flash memory to control backlight segments 62 in combination with a backlight unit segmentation controller 82. Embedded controller 78 receives status information from a touch controller 80 that detects touches at the display and an eye tracking module 83 that tracks eye gaze of an end user located proximate the information handling system. As described above, embedded controller 78 turns off segmented backlights where a keyboard or other large object blocks viewing of the display. In addition, adjusting the direction at which light exits a backlight segment provides a more consistent appearance of visual images to an end user.

More specifically, when display 20 is configured as a "DO" surface that accepts end user inputs for presentation at display 18 as a "SEE" surface, the viewing angle incidence of display 20 tends to be off of the orthogonal viewing angle that display 20 presents in normal operating conditions. The status of display 20 as a "DO" surface may be determined from a variety of sensors. One sensor addressed above is an accelerometer, such as by assigning a "DO" function to displays that have a horizontal disposition relative to a vertically disposed display. In such a situation, refracting backlight off of the orthogonal angle and away from display 18 provides a more direct illumination relative to the eyes of an end user viewing display 20. An eye gaze tracker 83 provides more exact data for the viewing angle by tracking the relative position of the end user's eye gaze to display 18 and 20. Based upon the detected eye position and gaze towards displays 18 and 20, embedded controller 78 determines if refractive correction to the viewing angle will improve brightness of each display's visual image and applies refractive correction to the display 18 or 20 that has the greatest correctable off axis viewing angle, such as the greatest difference for the user from an orthogonal viewing angle. In one example embodiment, use of a stylus at display 20, such as is detected by touch sensor 80, can also initiate refractive correction since the viewing angle associated with writing will tend to be off of the orthogonal axis. Further adjustments to correct for off axis viewing angles may be performed by adapting the amount of illumination output by individual backlight segments 62, such as increasing illumination at a segment where the amount of off axis viewing angle is larger and reducing illumination where the viewing angle matches the backlight illumination angle provided from the display.

Figure 8:
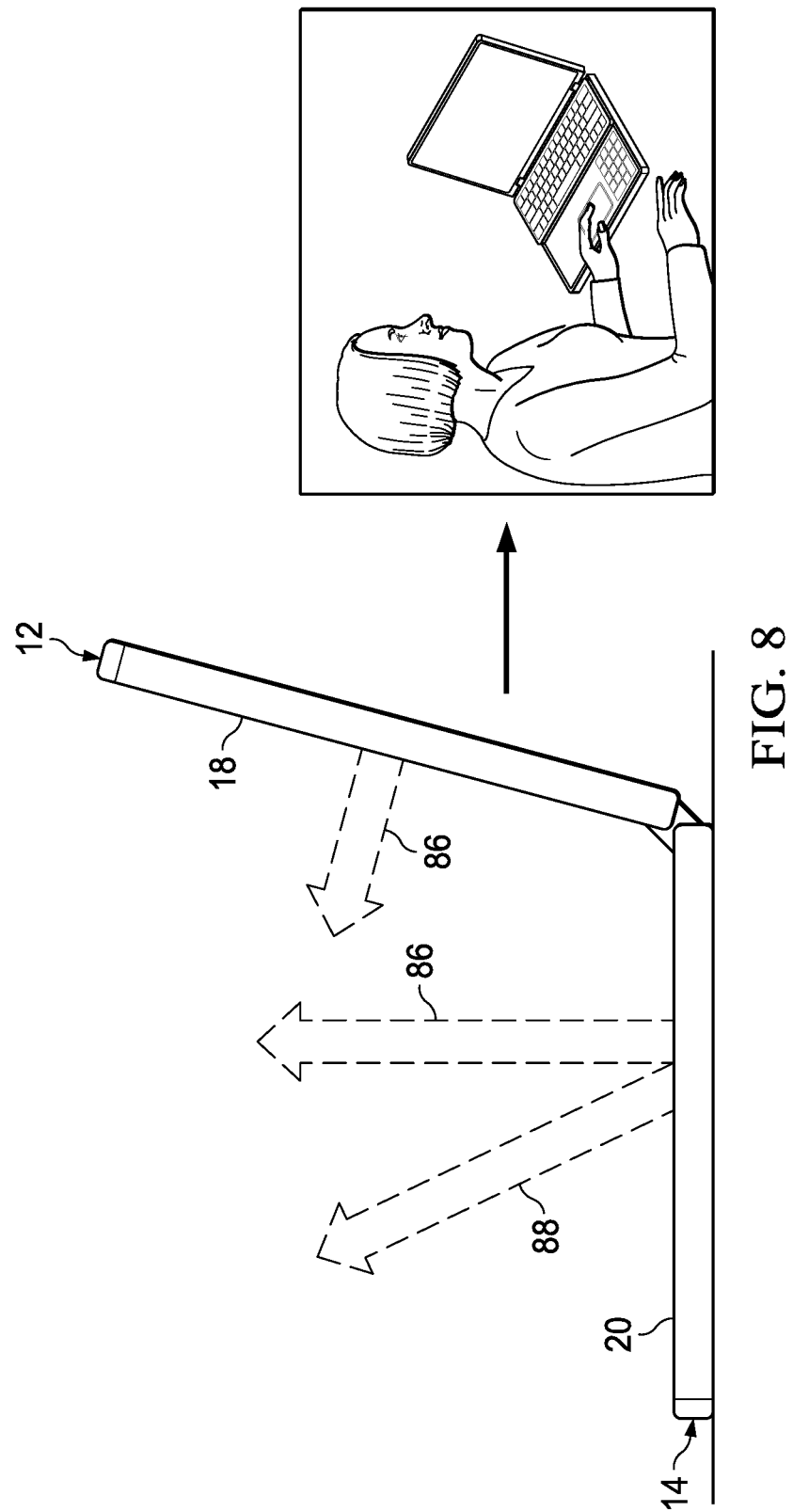
FIG. 8 depicts a side view of orthogonal and off-axis viewing angles that are corrected with a refractive layer.

Referring now to FIG. 8, a side view depicts orthogonal 86 and off-axis 88 viewing angles that are corrected with a refractive layer. The example embodiment depicts an information handling system resting on a support surface in a clamshell configuration. Main housing portion 14 has a horizontal orientation resting on a horizontal support surface and holding lid housing portion 12 in a vertical orientation relative to the support surface. In the depicted clamshell configuration, display 18 is held in a viewing position with an orthogonal axis 86 proceeding towards a viewing end user. Display 18 provides peak illumination for viewing along orthogonal axis 86 so that an end user viewing display 18 might rotate lid housing portion 12 slightly to align display 18 normal the end user and achieve the best illumination. In contrast, the end user viewing angle relative to main display 20 tends to be determined from the relative position of the support surface so that, in the clamshell configuration, an end user will tend to have a non-orthogonal axis viewing angle 88. When illumination is directed from main housing portion 14 on orthogonal axis 86, an end user located along non-orthogonal axis 88 will have reduced brightness, resulting in a lower quality visual image.

To improve the quality of the visual image, display 20 includes a refractive layer that, when activated, re-directs illumination from proceeding out orthogonal axis 86 to instead proceed out non-orthogonal axis 88. Although the example embodiment depicts main display portion 20 as adjusting the viewing angle in the clamshell mode, in a mirror configuration where lid housing portion rests on a support surface, a refractive layer in lid display 18 may adjust the viewing angle so that an end user may use information handling system 10 with either of housing portions 12 and 14 as the base that rests on a support surface. Further, in some instances an end user may be restricted from rotating housing portions 12 and 14 a full 90 degrees, such as when traveling and using information handling system 10 on an airplane seat tray. In such a situation where the ability to rotate the housings is restricted, activation of the refractive layer in lid display 18 may aid viewing quality. As described herein, determinations of whether to activate the refractive layer on both displays 18 and 20 may be made with reference to a variety of sensed data and a context at information handling system 10, such as the end user's viewing angle as measured by gaze tracking.

Figure 9:
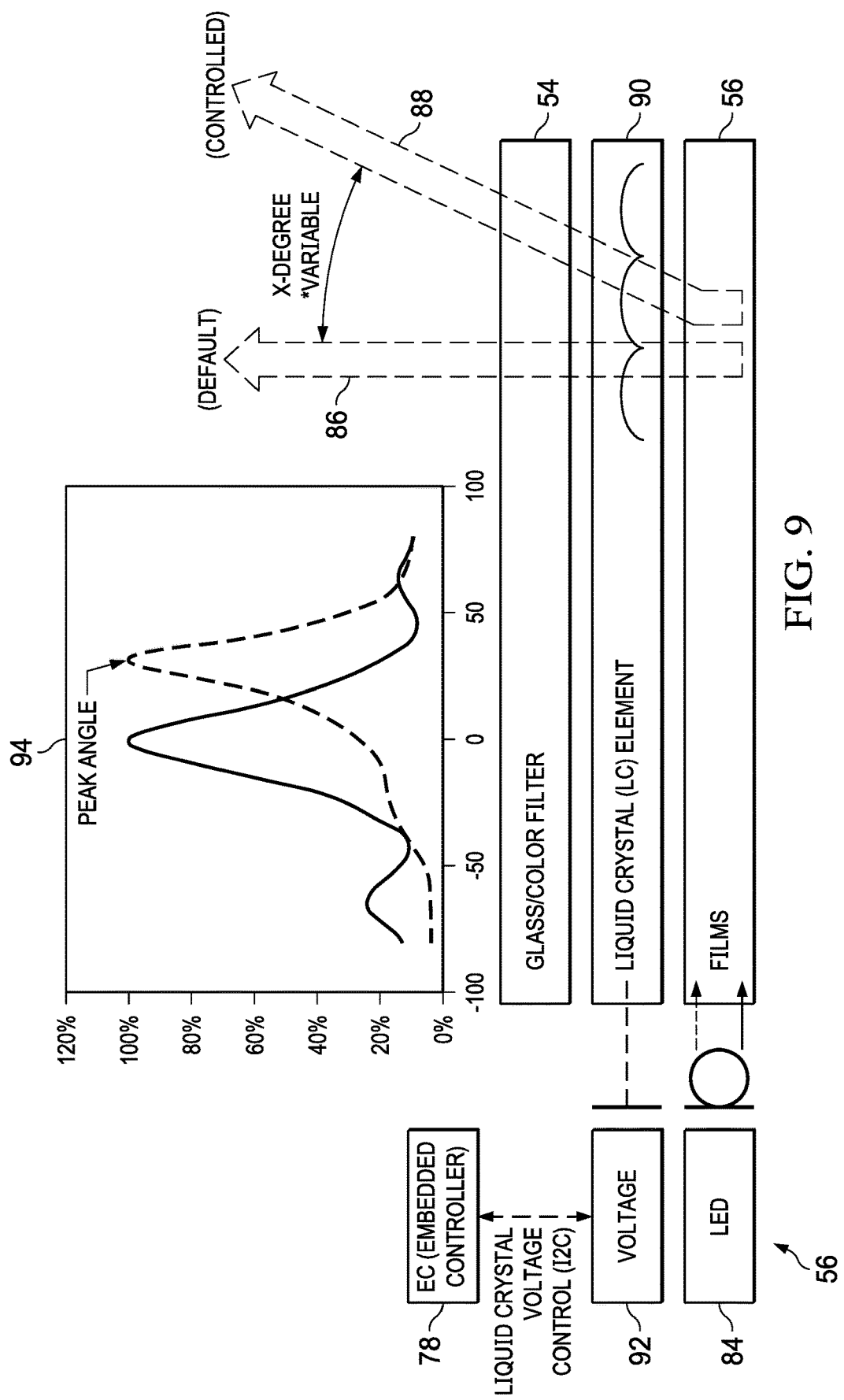
FIG. 9 depicts a side view of a main display to illustrate an example of viewing angle adaptation using a refractive layer.

Referring now to FIG. 9, a side view of main display 20 depicts an example of viewing angle adaptation using a refractive layer 90. Backlight 56 generates illumination that, in a default state, proceeds through a refractive layer 90 and liquid crystal panel 54 along an orthogonal axis 86. An embedded controller 78 interfaces with a refractive layer voltage controller 92 and an LED 84 to manage image brightness from main display 20. Upon detection of predetermined conditions that indicate an off axis viewing angle, embedded controller 78 applies a voltage to refractive layer voltage controller 92 to change refraction at refractive layer 90 so that light exits display 20 along non-orthogonal angle 88 instead of orthogonal angle 86. Graph 94 illustrates the change in peak viewing angle related to idle and activated states of refractive layer 90. In the example embodiment, a shift in viewing angle of approximately 30 degrees is provided by activation of refractive layer 90. In alternative embodiments, the amount of refraction may be controlled to plural variable angles so that viewing angle of display 20 may vary based upon end user relative position.

Figure 10A:
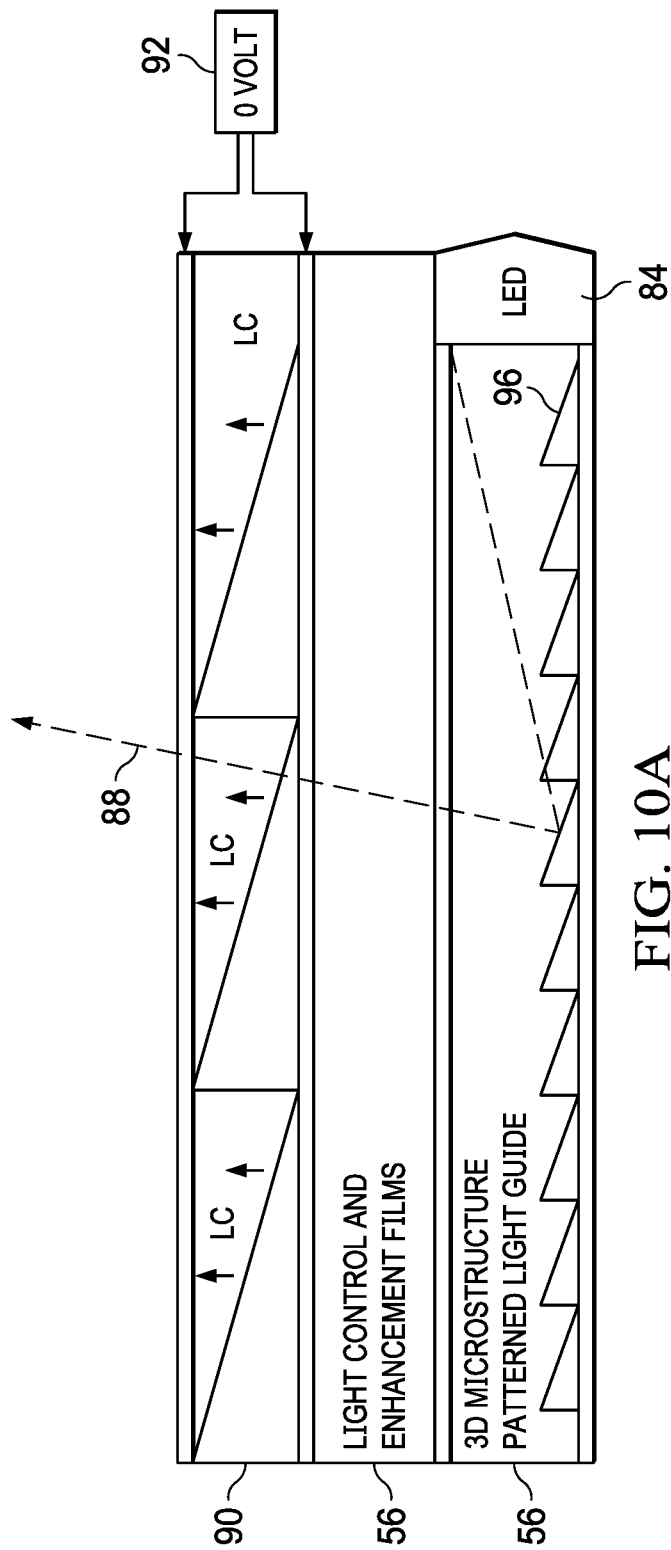
FIGS. 10A and 10B depict a side cutaway view of an example embodiment for managing viewing angle by activation of a refractive layer disposed in a display.
Figure 10B:
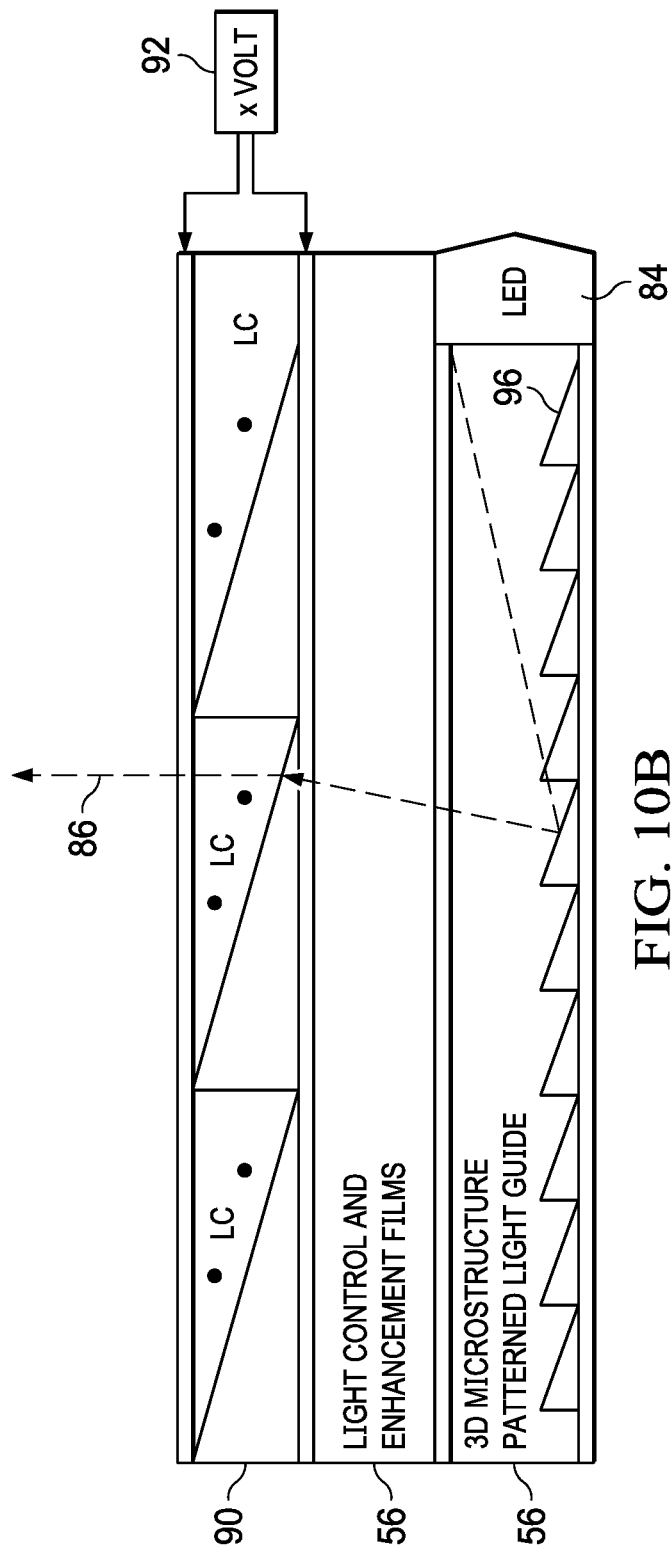

Referring now to FIGS. 10A and 10B a side cutaway view depicts an example embodiment for managing viewing angle by activation of a refractive layer disposed in a display. In the example embodiment, a non-orthogonal viewing angle 88 is provided from display 20 when refractive layer voltage controller 92 applies zero volts to refractive layer 90. Light generated by LED 84 proceeds through a light guide and is redirected through backlight 56 by a plurality of three dimensional microstructured mirrors 96 disposed at the bottom surface of backlight 56. Mirrors 96 redirect light along non-orthogonal axis 88 and through refractive layer 90, which does not change the light angle when voltage is absent. The non-orthogonal viewing angle 88 tends to align with an end user viewing angle with display 20 resting on a support surface in a "DO" configuration. In contrast, when voltage is applied by refractive layer voltage controller 92 to refractive layer 90, the resulting electric field modifies the state of liquid crystals in refractive layer 90 so that the refraction index of refractive layer 90 adjusts the viewing angle to an orthogonal viewing angle 86. In alternative embodiments, different arrangements of liquid crystals in refractive layer 90 may be used to output orthogonal viewing angle 86 when no voltage is applied to refractive layer 90 and non-orthogonal viewing angle 88 when voltage is applied. For example, to aid in reducing power consumption, main display 20 may bias to non-orthogonal viewing angle 88 with zero voltage in anticipation of a "DO" configuration while lid display 18 may bias to an orthogonal viewing angle 86 with zero voltage in anticipation of a "SEE" configuration. Although the example embodiment depicts an implementation with a liquid crystal display that adjusts backlight illumination, in an alternative embodiment, a refractive layer 90 may be placed over top of an OLED display to achieve the desired viewing angle adjustments.

Figure 11:
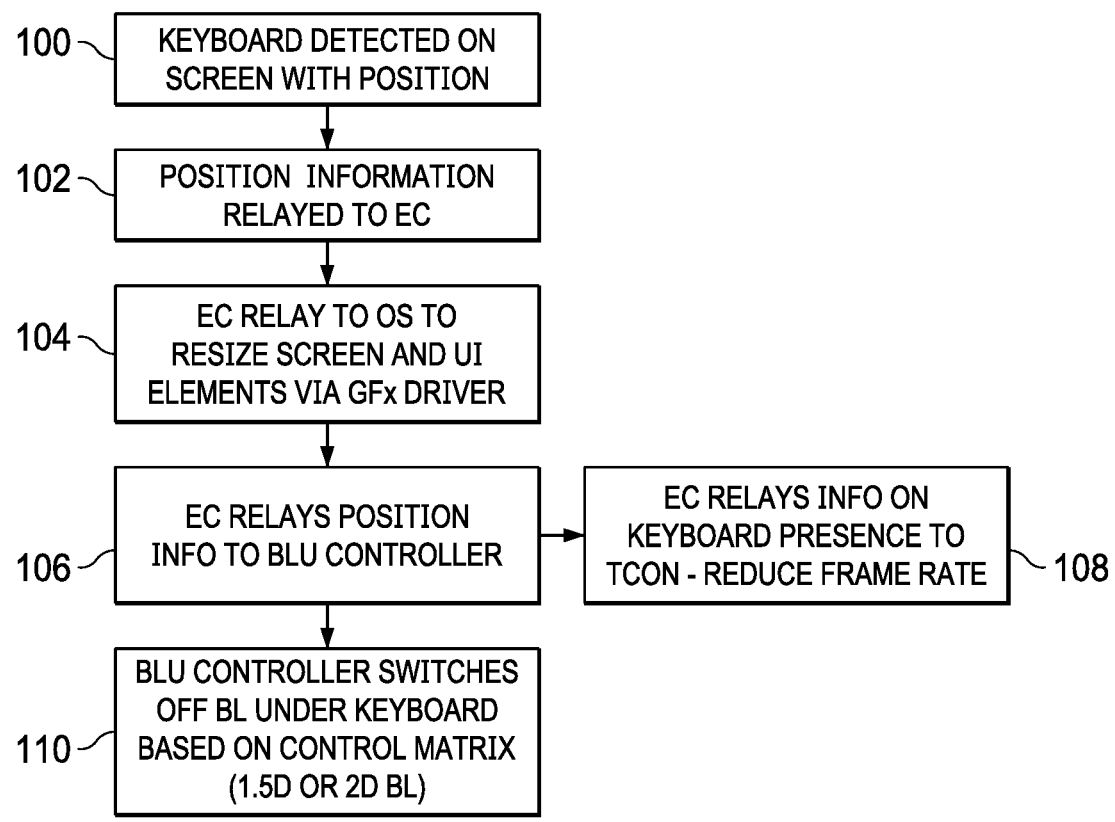
FIG. 11 depicts a flow diagram of a process for power saving at a display by reducing illumination with a segmented backlight.

Referring now to FIG. 11, a flow diagram depicts a process for power saving at a display by reducing illumination with a segmented backlight. The process starts at step 100 with detection of a keyboard placed on a display, such as based upon touches detected by a touchscreen and compare against known keyboard touch patterns. At step 102, position information for the keyboard is communicated to an embedded controller, such as an outline of the perimeter of the keyboard on the touchscreen. At step 104, the embedded controller relays the keyboard position to an operating system of the information handling system so that the operating system can coordinate a resizing of the display content with a graphics processor. In various embodiments, the operating system and graphics processor may adjust content across multiple displays to achieve a desired end user environment. For instance, placement of the keyboard may initiate a complete transfer of content from the display on which the keyboard rests to a vertical display, may initiate a smaller version of the content in an area not covered by the keyboard, may initiate presentation of user interfaces with a secondary light source or other types of content distributions. At step 106, the embedded controller relays the keyboard position information to a backlight control unit so that backlight segmentation may be used to reduce power consumption by stopping illumination underneath the keyboard. At step 108, the embedded controller also relays detection of the keyboard to the timing controller of the display so that the frame rate sweep of the display may be reduced to further save power. At step 110, the backlight controller switches off power to backlight segments located under the keyboard. In one embodiment, the backlight segments are selected for shutdown based upon a control matrix that identifies segments as groups based upon expected keyboard footprint.

Figure 12:
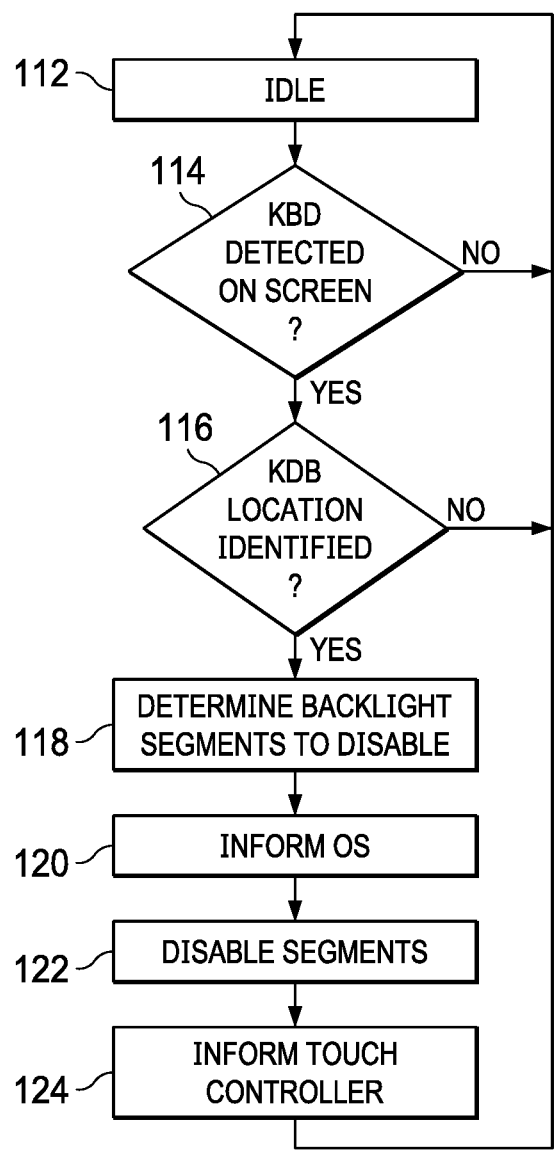
FIG. 12 depicts a flow diagram of a process for control of segmented backlights to optimize power consumption at a portable information handling system.

Referring now to FIG. 12, a flow diagram depicts a process for control of segmented backlights to optimize power consumption at a portable information handling system. The process starts at step 112 in an idle state and continues to step 114 upon detection of a change in touch state at a display touchscreen. At step 114, if a keyboard is not detected then the process returns to step 112, otherwise the process continues to step 116 to determine the keyboards position. If at step 116 the keyboard position is not identified, the process returns to step 112, otherwise the process continues to step 118 to provide the keyboard location to the backlight. At step 118, the backlight controller applies the keyboard location to determine which of the backlight segments to disable, such as those backlight segments that are covered by the keyboard. At step 120, the backlight controller sends a message to the operating system to indicate the backlight segments that will be powered down. At step 122, the determined backlight segments are disabled to turn off the backlight illumination in the segments, thus reducing power consumption. At step 124, the backlight controller communicates the powered down backlight segments to the touch controller. In various embodiments, the touch controller may disable touch detection and/or reporting at various parts of the display based upon the keyboard position. The process returns to step 112 to continue monitoring of keyboard position, such as to move the backlight segment illumination should the keyboard position shift.

Figure 13:
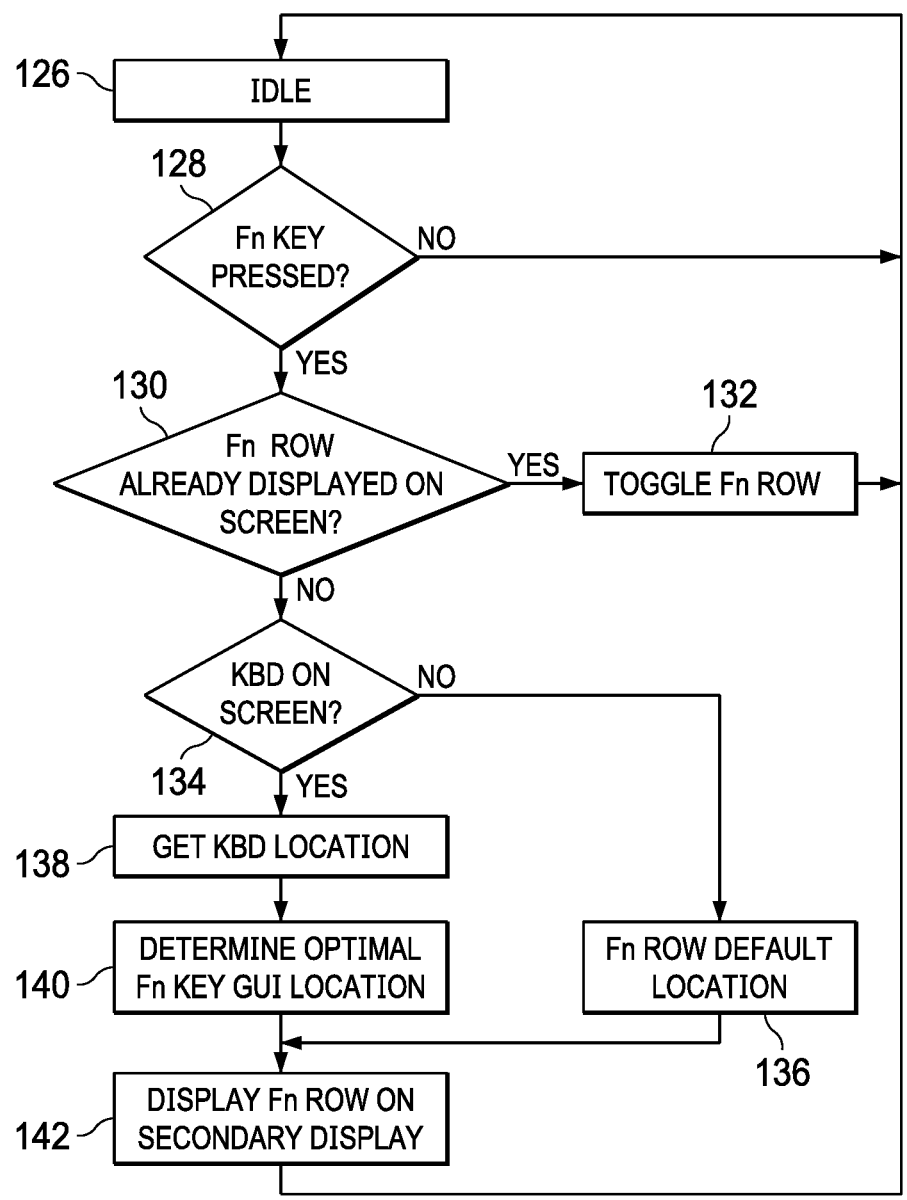
FIG. 13 depicts a flow diagram of a process for presentation of a function key row at a display based upon placement of a keyboard on the display.

Referring now to FIG. 13, a flow diagram depicts a process for presentation of a function key row at a display based upon placement of a keyboard on the display. The process starts at step 126 in an idle state awaiting at step 128 a press of a function key that commands presentation of the function row. At step 128, once a function key is pressed, the process continues to step 130 to determine if the function row is already presented on the display. If the function row is already presented, the process continues to step 132 to toggle the function row and returns to step 126. If at step 130 the function row is not presented, the process continues to step 134 to determine if the keyboard is placed on the display. If the keyboard is not present, the process continues to step 136 to present the function row at a default location, such as across the top of the display. If at step 134 the keyboard is detected on the display, the process continues to step 138 to get the keyboard location, such as based on keyboard touches at the display, and to step 140 to determine the optimal location for presentation of the function key row. For instance, if room is available between the keyboard and hinge, the function key is placed in that area along the upper perimeter of the keyboard; otherwise, the function key is placed at the lower side of the keyboard. At step 142, the function row is presented at the display in the determined position and the process returns to step 126. In one example embodiment, a backlight segment of the display aligned under the function key row may provide illumination to the function key row while all other backlight segments are powered off. In another embodiment, the default position for the function key row is supported with a fiber optic cable that carries illumination from a light source and the other locations are supported by visual images generated by the display and graphics processor, such as under control of the operating system.

Although the present invention has been described in detail, it should be understood that various changes, substitutions and alterations can be made hereto without departing from the spirit and scope of the invention as defined by the appended claims.

What is claimed is:

1. A portable information handling system comprising:
   plural housing portions;
   a hinge rotationally coupling at least a first and second of the plural housing portions to rotate between at least closed and clamshell configurations;
   a processor disposed in the first housing portion and operable to execute instructions that process information;
   a memory disposed in the first housing portion and interfaced with the processor, the memory operable to store the instructions and information;
   an embedded controller interfaced with the processor and operable to manage interactions with input devices;
   a graphics processor interfaced with the processor and operable to process the information to define visual images;
   first and second displays disposed over the first and second housing portions and interfaced with the graphics processor to present the visual images, at least one of the first and second displays having a segmented backlight of plural independently illuminated segments;

a controller interfaced with the segmented backlight and operable to independently illuminate and turn off the segments based upon one or more predetermined conditions, wherein the predetermined condition comprises placement of the keyboard on the at least one of the first and second displays and the controller turns off illumination from the segments disposed under the keyboard; and a secondary light source disposed under the one of the first and second displays and defining a rectangle shape, wherein the one of the first and second displays comprises a liquid crystal panel having plural pixels, the liquid crystal panel blanking the pixels to block illumination proximate the secondary light source and clearing the pixels to pass secondary light source illumination over the secondary light source.

2. The portable information handling system of claim 1, further comprising:

a function key user interface, wherein the controller illuminates the function key user interface with a segment proximate the keyboard.

3. The portable information handling system of claim 1, wherein the secondary light source comprises a light guide disposed in the rectangle shape.

4. The portable information handling system of claim 1, wherein the secondary light source comprises a fiber optic cable light source.

5. A system for displaying visual images, the system comprising:

a first display configured to integrate in a first housing portion and having plural backlight segments;

a second display configured to integrate in a second housing portion rotationally coupled to the first housing portion, the second display having plural backlight segments;

a controller interfaced with the first and second displays, the controller operable to detect a keyboard placed on one of the first and second displays and, in response, to power down the plural backlight segments disposed under the keyboard; and a secondary light source disposed under one or more of the plural backlight segments of the first display, wherein the controller highlights illumination of the secondary light source by commanding pixels over the secondary light source to a transparent state and commanding pixels bordering the secondary light source to an opaque state.

6. The system of claim 5, wherein:

the secondary light source defines a touchpad having a rectangle shape;

the controller commands pixels within the rectangle shape to the opaque state; and the controller disables touch detection outside of the rectangle shape.

7. The system of claim 6, wherein the secondary light source comprises a fiber optic cable.

8. A method for presenting visual images at an information handling system, the method comprising:

presenting visual images at first and second displays integrated in first and second housing portions, each of the first and second displays having plural backlight segments;

detecting the first and second housing portions in a clamshell configuration having the first housing portion oriented as a base;

detecting a keyboard placed on the first display;

defining covered and uncovered portions of the first display based upon the keyboard position on the first display;

in response to the detecting a keyboard, powering down plural of the backlight segments at the first display covered portion and presenting the visual images with one or more of the backlight segments at the first display uncovered portion;

illuminating a secondary light source in the uncovered portion of the first display;

powering down one or more backlight segments disposed proximate the secondary light source;

clearing a first set of plural pixels of a liquid crystal panel, the first set of plural pixels disposed over the secondary light source in the uncovered portion to form a shape; and blanking a second set of the pixels of the liquid crystal panel, the second set of plural pixels disposed proximate the first set of plural pixels.

9. The method of claim 8, further comprising:

presenting a function user interface at the first display proximate the keyboard; and illuminating the function user interface with at least one of the backlight segments disposed under the function user interface.

10. The method of claim 8, further comprising:

blanking a liquid crystal panel of the first display covered portion; and selecting content to present at the uncovered portion based upon the keyboard position on the first display.

11. The method of claim 8, wherein:

the secondary light source comprises a line forming a rectangle having a perimeter; and blanking the second set of the pixels further comprises blanking all of the pixels within the perimeter.

12. The method of claim 11, further comprising disabling touch detection of the first display except within the perimeter.

13. The method of claim 12, wherein the secondary light source comprises a fiber optic trace disposed under the first display backlight segments.

* * * * *